Feb. 17, 1959 A. V. CANDLER 2,873,508
FEED MECHANISM FOR RADIAL SAW
Filed April 24, 1957 2 Sheets-Sheet 1

INVENTOR.
ARDEN V. CANDLER
BY M. A. Hobbs
ATTORNEY

Feb. 17, 1959 A. V. CANDLER 2,873,508
FEED MECHANISM FOR RADIAL SAW
Filed April 24, 1957 2 Sheets-Sheet 2

INVENTOR.
ARDEN V. CANDLER
BY
M. A. Hobbs
ATTORNEY ated Feb. 17, 1959

2,873,508
FEED MECHANISM FOR RADIAL SAW
Arden V. Candler, South Bend, Ind.

Application April 24, 1957, Serial No. 654,868

4 Claims. (Cl. 29—69)

The present invention relates to wood working machinery and more particularly to power saws of the type having a circular blade mounted on a horizontally movable carriage above the work table.

In conventional radial saws a circular saw blade is supported by and freely movable on a carriage on a track above the work table and the track is pivoted on a post at the rear of the table. Saws of this type have been found to be particularly adapted for cutting thin sections of metal such as aluminum molding, window stripping, door stops and framing for curtain wall windows. In sawing this material with the conventional radial saw the lower edge of the saw is placed even with the table top and the material against the fence and the saw is pulled manually through the material. Since the stripping, framing and the like often vary substantially in thickness from one part to another, the rate at which the saw is fed into the material is normally varied accordingly. If a uniform rate of feed is employed it must be the slow rate required for the thicker sections. Therefore for maximum operating efficiency the rate of feed is decreased for the thicker sections and increased for the thinner sections. However, in cutting material of varying thickness, it is often difficult to anticipate the change in section thickness in time to make the appropriate adjustment in the feed rate; consequently, the saw becomes choked or jumps or crawls onto the material, possibly damaging the material and injuring the operator. It is therefore one of the principal objects of the present invention to provide a mechanism for controlling the feed of a radial saw so that the rate at which the saw is fed into material having varying thickness can be changed instantaneously and accurately to correspond to changes in said thickness.

Another object of the present invention is to provide a relatively easily installed manually operated feed mechanism for a radial saw which gives the operator full and ready control of the saw movement during the cutting operation and which permits rapid return of the saw to its initial starting position.

Still another object of the invention is to provide a variable speed feed control mechanism for a radial saw which prevents the saw from jumping or crawling onto the material in the event the saw is fed too rapidly into the material for it to cut properly.

A further object is to provide a feed control mechanism for a radial saw which can easily be assembled on or disassembled from the arm of the saw and which can be operated without any special skill or knowledge.

Additional objects and advantages will become apparent from the following description and accompanying drawings, wherein.

Figure 1:
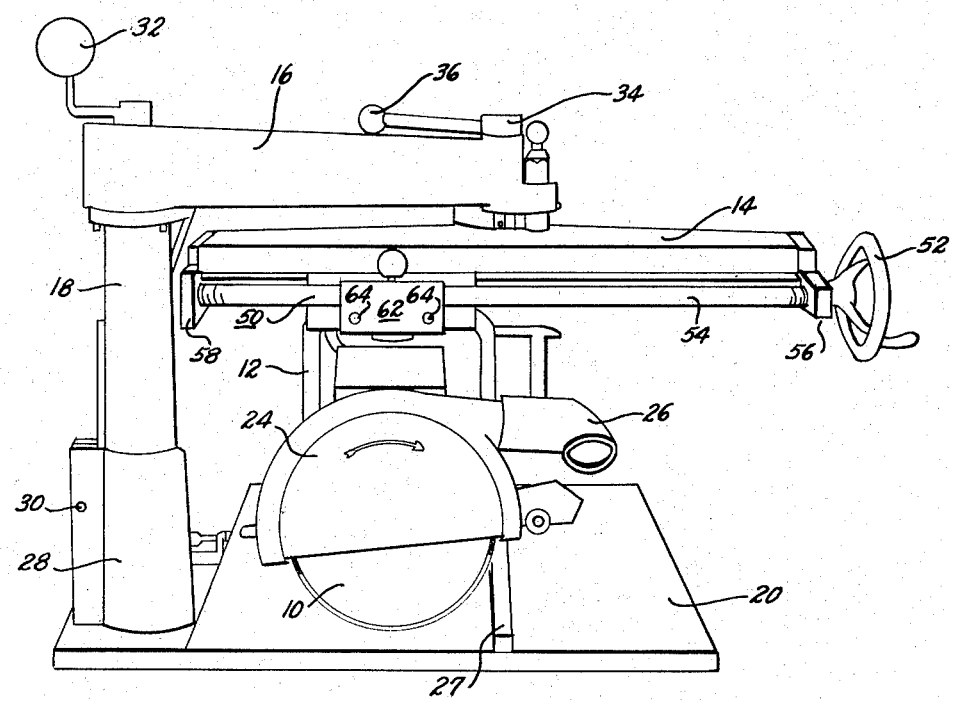
Figure 1 is a perspective side elevational view of a radial saw embodying my saw feed mechanism.

Referring more specifically to the drawings and to Figure 1 in particular, numeral 10 designates a circular saw blade, 12 a saw carriage, 14 a track supported by radial arm 16 and a column 18 for adjustably mounting the carriage above a table 20. The saw is driven by a motor 22 mounted on carriage 12. The usual adjustable saw guard 24, including a dust spout 26, is provided over the saw blade and a fence 27 is mounted on the table.

Column 18 is mounted in base 28 secured to table 20 and is adapted to be adjusted vertically by loosening screw 30 and rotating with knob 32 an elevating screw (not shown) disposed in column 18. The saw is adjusted for angular cuts by rotating track 14 on its trunnion 34 at the end of radial arm 16. In order to make radial adjustments of track 14 the trunnion is first loosened by operating knob 36.

Figure 2:
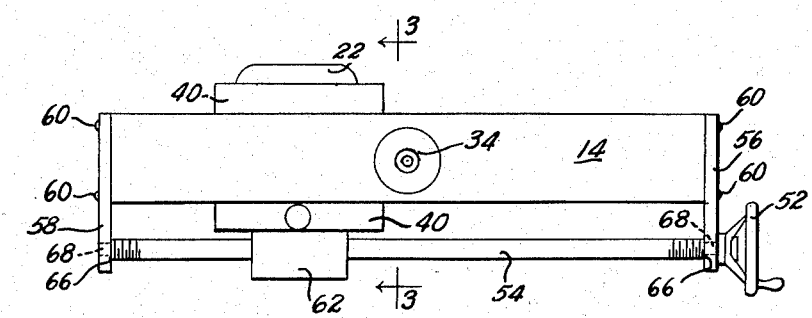
Figure 2 is a top plan view of the radial saw track of the radial saw illustrated in Figure 1, showing more clearly the construction and operation of my feed mechanism.
Figure 3:
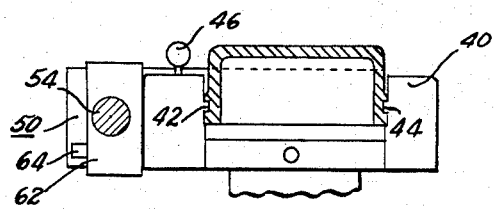
Figure 3 is a cross sectional view of the track and feed mechanism shown in Figure 2, taken on line 3—3 of Figure 2.
Figure 4:
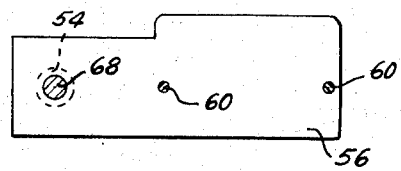
Figure 4 is an end view of the track and a partial cross section of my feed mechanism.

The saw carriage is slidably mounted on track 14 by a head member 40 including bearings (not shown) disposed on either side of the track and adapted to slide in grooves 42 and 44 (Figure 3). The carriage may be locked in any desired position on track 14 by a lock assembly (not shown) operated by knob 46. Without the present improvement incorporated in the saw apparatus, the carriage is free to move along track 14 from one end to the other unless it is locked by the lock assembly. The present saw feed mechanism permits the operator to vary the feed rate of the saw to allow for variations in thickness of the sections of metal being cut by the saw and thus eliminates choking and climbing as previously described herein. This is accomplished by a screw and tap mechanism generally shown at numeral 50, mounted on track 14 and connected to the saw carriage and controlled by a manually operated wheel or crank 52. The embodiment of the mechanism shown in the drawings consists of a screw 54 mounted longitudinally on one side of the track and rotatably supported at the ends by plates 56 and 58 (Figures 1 and 2) secured to the ends of track 14 by screws or studs 60. A tap unit 62 is threadedly mounted on screw 54 and is rigidly connected to head member 40 by screws 64 extending laterally through the lower part of said tap unit. Screw 54 is held against longitudinal movement by shoulders 66 formed by the reduced diameter end portions 68 of the screw. In the embodiment shown in Figure 1 tap unit 62 is permanently mounted on screw 54 and is moved by rotation of hand wheel 52 along the screw to move the carriage through the cutting operation from left to right, as seen in Figure 1, and is returned to the initial starting position by reversed rotation of the hand wheel.

Figure 5:
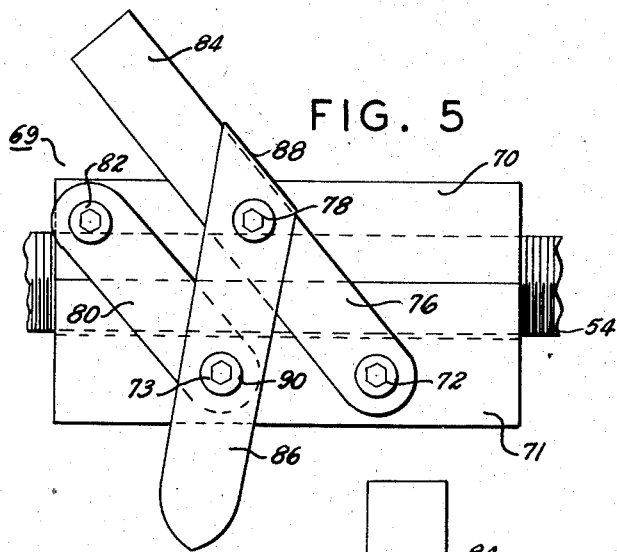
Figures 5 and 6 are enlarged side and end elevational views, respectively, of a part of my feed mechanism showing the mechanism in operating position.
Figure 6:
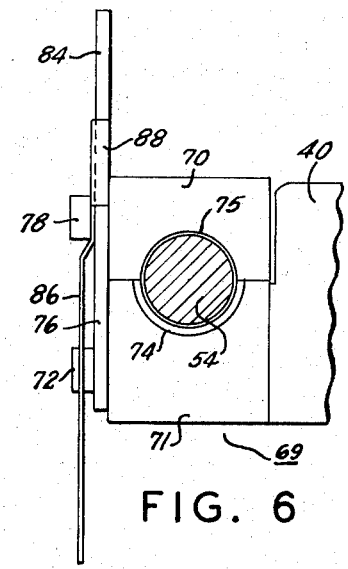
Figure 7:
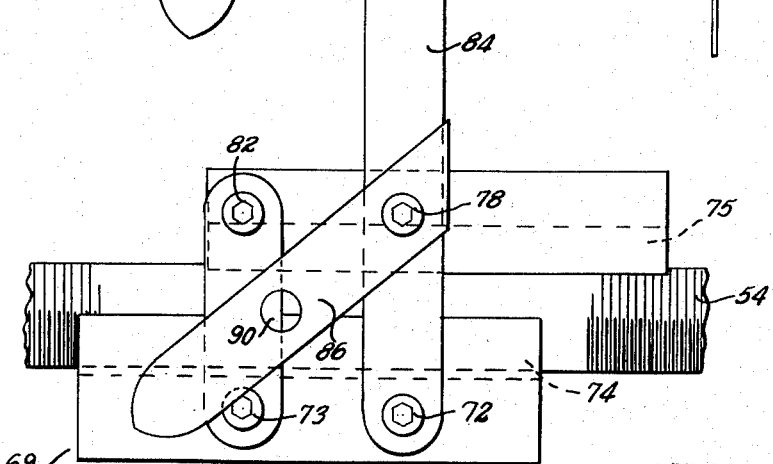
Figure 7 is an enlarged side elevational view of the same part of the feed mechanism seen in Figures 5 and 6, showing said mechanism in non-operating position.

The tap unit 69 shown in Figures 5, 6 and 7 is the preferred form of this element, and consists of an upper block 70 and a lower block 71, the latter block being joined rigidly to head member 40 by screws 72 and 73 and having a groove 74 longitudinally disposed with reference to screw 54. The groove is substantially larger than the screw so that block 71 will not interfere with the free movement of the head member on track 14. The upper block 70 contains a groove 75 having side walls threaded to engage screw 54 when in its operating position, as seen in Figure 5. Tap unit 69 is swung between its closed position (operating position) and its open position (non-operating position) by pivoted lever 76 secured to blocks 70 and 71 by screws 78 and 72, respectively, and pivoted lever 80 secured to said blocks by screws 73 and 82. An extension 84 is provided on the upper end of lever 76 to form a hand grip for moving block 70 between its operating position shown in Figure 5 and its non-operating position shown in Figure 7. When block 70 is in the position shown in Figure 5 the threads in the groove of said block mesh with the threads of screw 54 so that the tap member will be moved along said screw as hand wheel 52 is rotated to move the saw carriage, and when block 70 is in the position shown in Figure 7 the threads in the groove are completely disengaged from the screw so that the saw carriage can be moved freely to any position on track 14. Block 70 is locked in its operating position by a leaf spring lever 86 secured firmly to lever 76 by screw 78 and flange 88 turned over the edge of lever 76. A hole 90 is provided in lever 86 to permit the lever to slip over screw 73 and lock block 70 in engagement with screw 54, i. e. in operating position. In order to unlock tap unit 69, spring lever 86 is lifted until it clears the head of screw 73 and then extension 84 is moved to the right as seen in Figures 5 and 7, thereby lifting block 70 and disengaging the threads on said block from the threads on screw 54. To lock unit 62, extension 84 is rotated to the left moving block 70 downwardly into engagement with screw 54 and slipping lever 86 over screw 73 to the point where the head of said screw passes through hole 90, thus firmly holding block 70 in its operating position.

In the operation of the present radial saw for cutting metal framing and the like, the saw carriage is first moved to the left hand end of track 14 and the metal framing to be cut is placed on the table firmly against the left side of fence 27. Unit 69 is then closed to operating position and the motor driving the saw is started. The operator advances the saw and feeds it into the material at the proper cutting rate by rotating hand wheel 52, varying the rate of feed to correspond with the variations in the thickness of the material. After the saw has passed through the material and the material has been moved from cutting position on the table, unit 69 is unlocked and the saw carriage moved freely to its initial starting position to the left hand side of the table. By accurately controlling the feed rate to correspond to variations in thickness and hardness of the material being cut, choking and climbing of the saw are eliminated and damage to the material and danger to the operator are avoided.

Inasmuch as radial saws of the foregoing type are extensively used to saw a variety of materials, some of which may require closely controlled feed and others not, the present feed mechanism is designed so that it can be easily mounted on and removed from the saw apparatus. In the installation shown in the drawings the mechanism is held in place by only six easily removable screws, two 72 and 73, connecting the tap unit to the saw carriage and two, 60, at each end to secure the mechanism to track 14. Various changes can be made in the mechanism described herein without departing from the scope of the present invention.

I claim:

1. In a radial saw having a saw carriage mounted on a track, a screw arranged longitudinally of said track, a member disposed at each end of said track and joined rigidly thereto for rotatably supporting said screw alongside of said track, a wheel for manually rotating said screw, a rapidly releasable mechanism for connecting the carriage and screw comprising: a block under said screw connected rigidly to the saw carriage and having a groove longitudinal with and of a larger diameter than said screw, a second block above said first mentioned block having a threaded groove longitudinal with said screw and adapted to engage said screw, two parallel levers pivotally connected to the corresponding sides of said blocks, a handle for lifting said last mentioned block from engagement with said screw, a projection on said first mentioned block, and a resilient lever mounted on said second mentioned block and having a hole therein for slipping over said projection to lock said second mentioned block into engagement with said screw.

2. In a feed mechanism for a radial saw having a saw carriage mounted on a track, a screw arranged longitudinally of said track, a member disposed at each end of said track and joined rigidly thereto for rotatably supporting said screw on said track, a means at the forward end of said track for manually rotating said screw: a block under said screw connected rigidly to the saw carriage and having a groove longitudinal with said screw, a second block above said first mentioned block having a threaded groove longitudinal with said screw and adapted to engage said screw, two parallel levers pivotally connected to the corresponding sides of said blocks, a projection on one of said blocks, and a lever having a hole therein on the other of said blocks for slipping over said projection to lock said second mentioned block into engagement with said screw.

3. In a feed mechanism for a radial saw having a saw carriage mounted on a track, a screw arranged longitudinally of said track, a means at the forward end of said track for manually rotating said screw: a block under said screw connected rigidly to the saw carriage and having a groove longitudinal with and of a larger diameter than said screw, a vertically movable second block disposed above said first mentioned block and having a threaded portion adapted to engage said screw, a handle relatively movable on each of the blocks for lifting said last mentioned block from engagement with said screw, a projection on said first mentioned block, and a resilient lever connected to said second mentioned block and having a hole therein for slipping over said projection to lock said second mentioned block into engagement with said screw.

4. In a radial saw having a saw carriage mounted on a track, a screw arranged longitudinally of said track, a means for rotating said screw, a feed mechanism comprising: a block adjacent to said screw connected rigidly to the saw carriage, a second block movable laterally from said screw having a threaded portion thereon adapted to engage said screw, two parallel levers pivotally connected to the corresponding sides of said blocks, a handle for lifting said last mentioned block from engagement with said screw, a projection on said first mentioned block, and a resilient lever on said second mentioned block having a hole therein for slipping over said projection to lock said second mentioned block into engagement with said screw.

References Cited in the file of this patent

UNITED STATES PATENTS

| | | |
|---|---|---|
| 531,427 | Roche | Dec. 25, 1894 |
| 1,073,101 | Dodson | Sept. 16, 1913 |
| 1,530,396 | O'Brien | Mar. 17, 1925 |
| 1,733,518 | Snover | Oct. 29, 1929 |
| 2,142,303 | Crouch | Jan. 3, 1939 |
| 2,312,356 | Ocenasek | Mar. 2, 1943 |
| 2,722,952 | Snyder | Nov. 8, 1955 |